United States Patent
Kunz et al.

(10) Patent No.: US 11,936,525 B2
(45) Date of Patent: Mar. 19, 2024

(54) DETERMINING A TIME TO PERFORM AN UPDATE

(71) Applicant: Lenovo (Singapore) PTE. LTD., New Tech Park (SG)

(72) Inventors: Andreas Kunz, Ladenburg (DE); Prateek Basu Mallick, Dreieich (DE); Karthikeyan Ganesan, Nauheim (DE); Dimitrios Karampatsis, Ruislip (GB)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 366 days.

(21) Appl. No.: 17/278,613

(22) PCT Filed: Jul. 21, 2020

(86) PCT No.: PCT/IB2020/020040
§ 371 (c)(1),
(2) Date: Mar. 22, 2021

(87) PCT Pub. No.: WO2021/064472
PCT Pub. Date: Apr. 8, 2021

(65) Prior Publication Data
US 2022/0303175 A1    Sep. 22, 2022

Related U.S. Application Data

(60) Provisional application No. 62/909,031, filed on Oct. 1, 2019.

(51) Int. Cl.
*H04L 41/082* (2022.01)
*G06F 8/65* (2018.01)
(Continued)

(52) U.S. Cl.
CPC .............. *H04L 41/082* (2013.01); *G06F 8/65* (2013.01); *H04W 4/08* (2013.01); *H04W 12/02* (2013.01)

(58) Field of Classification Search
CPC .......... H04L 41/082; G06F 8/65; H04W 4/08; H04W 12/00
(Continued)

(56) References Cited

U.S. PATENT DOCUMENTS 7,539,778 B2 * 5/2009 Hansmann .......... G06F 16/9574
                                                                        709/224
8,438,258 B2 * 5/2013 Leng ..................... G06F 16/972
                                                                        709/224
(Continued)

FOREIGN PATENT DOCUMENTS

WO    2006/062289 A1    6/2006
WO    WO-2006062289 A1 * 6/2006 ............. G06F 21/33

OTHER PUBLICATIONS

PCT/IB2020/020040, "Notification of Transmittal of the International Search Report and the Written Opinion of the International Searching authority, or the Declaration", International Searching Authority, dated Sep. 22, 2020, pp. 1-12.
(Continued)

*Primary Examiner* — Tauqir Hussain
(74) *Attorney, Agent, or Firm* — Kunzler Bean & Adamson

(57) ABSTRACT

Apparatuses, methods, and systems are disclosed for determining a time to perform an update. One method (900) includes transmitting (902) first information indicating an initial value. The method (900) includes transmitting (904) second information indicating an update interval corresponding to the initial value. The method (900) includes updating (906) an identifier at a time determined based on the initial value and the update interval.

20 Claims, 12 Drawing Sheets

(51) Int. Cl.
*H04W 4/08* (2009.01)
*H04W 12/02* (2009.01)

(58) Field of Classification Search
USPC .......................................................... 709/224
See application file for complete search history.

(56) References Cited

U.S. PATENT DOCUMENTS

| | | | |
|---|---|---|---|
| 10,586,617 B1* | 3/2020 | McNair .................. | G16H 50/30 |
| 10,650,369 B1* | 5/2020 | Abdi Taghi Abad ........................ | |
| | | | G06Q 20/204 |
| 10,795,979 B2* | 10/2020 | Chan ...................... | H04L 67/306 |
| 10,922,631 B1* | 2/2021 | Shahidzadeh ......... | H04W 4/029 |
| 2013/0061036 A1* | 3/2013 | Oliver ................. | H04L 63/0421 |
| | | | 713/150 |
| 2014/0351411 A1* | 11/2014 | Woods .................. | H04W 4/021 |
| | | | 709/224 |
| 2019/0223018 A1* | 7/2019 | Norrman ................. | H04W 8/08 |
| 2019/0238529 A1* | 8/2019 | Sun ..................... | H04L 63/0815 |
| 2019/0244602 A1* | 8/2019 | Shyong ............... | G06F 16/9017 |
| 2020/0097640 A1* | 3/2020 | Leake .................. | H05B 47/175 |
| 2020/0153836 A1* | 5/2020 | Johnson .............. | H04L 63/1416 |
| 2020/0162255 A1* | 5/2020 | Hunt ..................... | H04L 63/083 |
| 2021/0042764 A1* | 2/2021 | Rungta ............... | H04L 63/0853 |
| 2021/0056509 A1* | 2/2021 | Lindy ..................... | G06Q 40/12 |
| 2021/0194869 A1* | 6/2021 | Zhao ..................... | H04L 9/0891 |
| 2022/0046070 A1* | 2/2022 | Adams .................... | H04L 41/04 |

OTHER PUBLICATIONS

3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.5.0, Dec. 2020, pp. 1-58.

3GPP, "3rd Generation Partnership Project; Technical Specification Group Services and System Aspects; Study on architecture enhancements for the Evolved Packet System (EPS) and the 5G System (5GS) to support advanced V2X services (Release 16)", 3GPP TR 23.786 V16.1.0, Jun. 2019, pp. 1-119.

3GPP, "3rd Generation Partnership Project; Technical Specification Group Services and System Aspects; Study on security aspects of 3GPP support for advanced Vehicle-to-Everything (V2X) services (Release 16)", 3GPP TR 33.836 V16.1.0, Sep. 2020, pp. 1-51.

Qualcomm Inc, Interdigital Inc, "Support of the group communication over NR PC5", 3GPP SA WG2 Meeting #129, S2-1810808, Oct. 15-19, 2018, pp. 1-5.

* cited by examiner

DETERMINING A TIME TO PERFORM AN UPDATE

CROSS-REFERENCE TO RELATED APPLICATIONS

This application claims priority to U.S. patent application Ser. No. 62/909,031 entitled "APPARATUSES, METHODS, AND SYSTEMS FOR V2X LAYER 2 GROUP ID CHANGE" and filed on Oct. 1, 2019 for Andreas Kunz, which is incorporated herein by reference in its entirety.

FIELD

The subject matter disclosed herein relates generally to wireless communications and more particularly relates to determining a time to perform an update.

BACKGROUND

The following abbreviations are herewith defined, at least some of which are referred to within the following description: Third Generation Partnership Project ("3GPP"), $4^{th}$ Generation ("4G"), $5^{th}$ Generation ("5G"), 5G System ("5GS"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), Evolved Packet System ("EPS"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1-sub 6 GHz frequency bands and/or 410 MHz to 7125 MHz ("FR1"), Frequency Range 2-24.25 GHz to 52.6 GHz ("FR2"), Universal Geographical Area Description ("GAD"), Guaranteed Bit Rate ("GBR"), Group Leader ("GL"), GLObal'nava NAvigatsionnava Sputnikovava Sistema ("GLONASS"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Intelligent Transport System Application Object Identifier ("ITS-AID"), Key Derivation Function ("KDF"), Key Management Function ("KMF"), Layer 1 ("L1"), Layer 2 ("L2"), Layer 2 Identifier ("L2 ID"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Provider Service Identifier ("PSID"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Quasi-Zenith Satellite System ("QZSS"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), System Information Block No. 9 ("SIB9"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Coordinated Universal Time ("UTC"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, identifiers may be used.

BRIEF SUMMARY

Methods for determining a time to perform an update are disclosed. Apparatuses and systems also perform the functions of the methods. One embodiment of a method includes transmitting first information indicating an initial value. In some embodiments, the method includes transmitting second information indicating an update interval corresponding to the initial value. In certain embodiments, the method includes updating an identifier at a time determined based on the initial value and the update interval.

One apparatus for determining a time to perform an update includes a transmitter that: transmits first information indicating an initial value; and transmits second information indicating an update interval corresponding to the initial value. In various embodiments, the apparatus includes a processor that updates an identifier at a time determined based on the initial value and the update interval.

Another embodiment of a method for determining a time to perform an update includes transmitting first information indicating an identifier. In some embodiments, the method includes transmitting second information indicating a one time use value. In certain embodiments, the method includes updating an identifier at a time the second information is received based on the one time use value.

Another apparatus for determining a time to perform an update includes a transmitter that: transmits first information indicating an identifier; and transmits second information indicating a one time use value. In various embodiments, the apparatus includes a processor that updates an identifier at a time the second information is received based on the one time use value.

Yet another embodiment of a method for determining a time to perform an update includes receiving first information indicating an initial value. In some embodiments, the method includes receiving second information indicating an update interval corresponding to the initial value. In certain embodiments, the method includes updating an identifier at a time determined based on the initial value and the update interval.

Yet another apparatus for determining a time to perform an update a receiver that: receives first information indicating an initial value; and receives second information indicating an update interval corresponding to the initial value. In various embodiments, the apparatus includes a processor that updates an identifier at a time determined based on the initial value and the update interval.

A further embodiment of a method for determining a time to perform an update includes receiving first information indicating an identifier. In some embodiments, the method includes receiving second information indicating a one time use value. In certain embodiments, the method includes updating an identifier at a time the second information is received based on the one time use value.

A further apparatus for determining a time to perform an update a receiver that: receives first information indicating an identifier; and receives second information indicating a one time use value. In various embodiments, the apparatus includes a processor that updates an identifier at a time the second information is received based on the one time use value.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
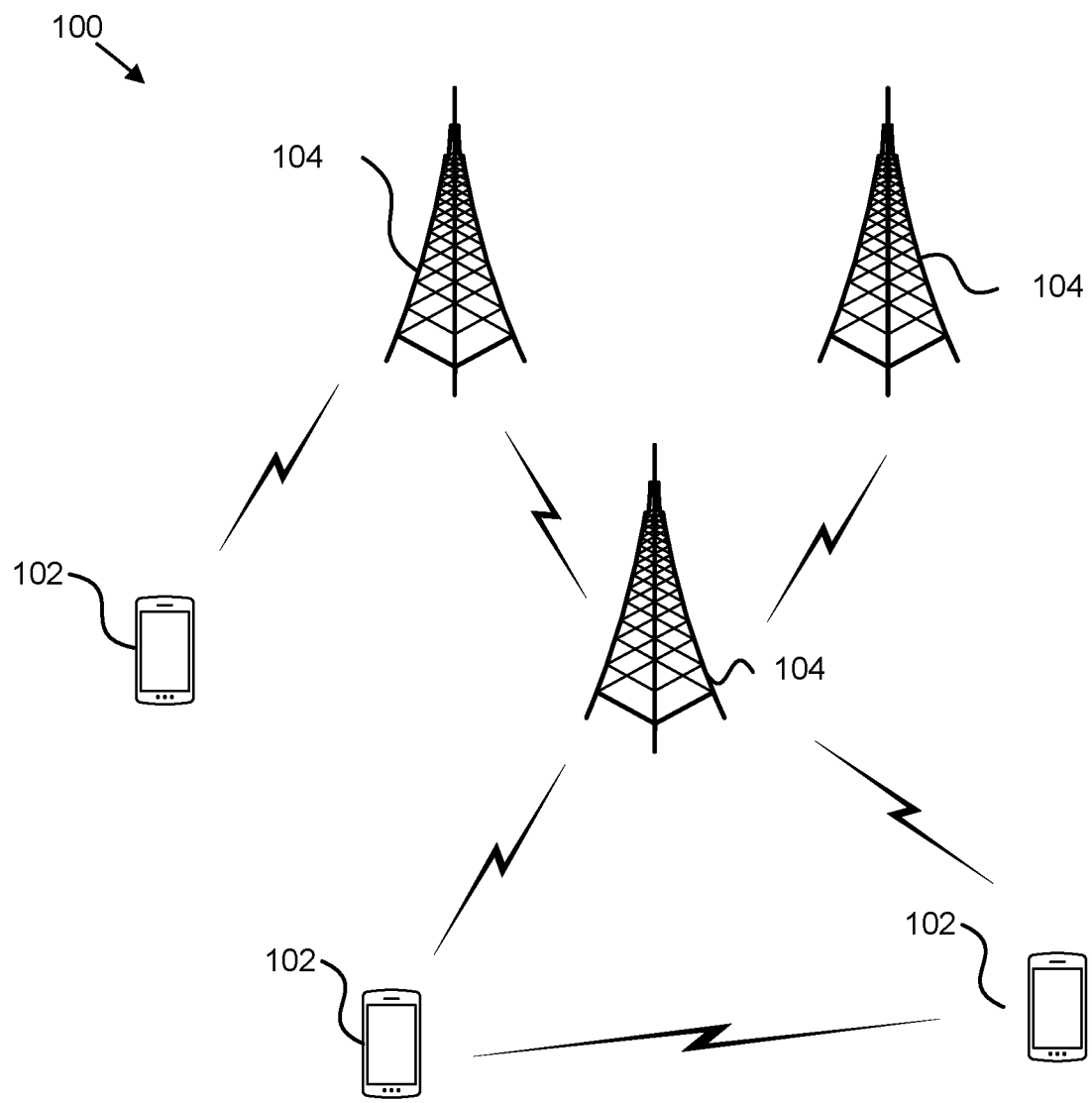
FIG. 1 is a schematic block diagram illustrating one embodiment of a wireless communication system for determining a time to perform an update.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more to computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a time to perform an update. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 and/or a network unit 104 may transmit first information indicating an initial value. In some embodiments, the remote unit 102 and/or the network unit 104 may transmit second information indicating an update interval corresponding to the initial value. In certain embodiments, the remote unit 102 and/or the network unit 104 may update an identifier at a time determined based on the initial value and the update interval. Accordingly, the remote unit 102 and/or the network unit 104 may be used for determining a time to perform an update.

In certain embodiments, a remote unit 102 and/or a network unit 104 may transmit first information indicating an identifier. In some embodiments, the remote unit 102 and/or the network unit 104 may transmit second information indicating a one time use value. In various embodiments, the remote unit 102 and/or the network unit 104 may update an identifier at a time the second information is received based on the one time use value. Accordingly, the remote unit 102 and/or the network unit 104 may be used for determining a time to perform an update.

In some embodiments, a remote unit 102 and/or a network unit 104 may receive first information indicating an initial value. In certain embodiments, the remote unit 102 and/or the network unit 104 may receive second information indicating an update interval corresponding to the initial value. In various embodiments, the remote unit 102 and/or the network unit 104 may update an identifier at a time determined based on the initial value and the update interval. Accordingly, the remote unit 102 and/or the network unit 104 may be used for determining a time to perform an update.

In certain embodiments, a remote unit 102 and/or a network unit 104 may receive first information indicating an identifier. In some embodiments, the remote unit 102 and/or the network unit 104 may receive second information indicating a one time use value. In various embodiments, the remote unit 102 and/or the network unit 104 may update an identifier at a time the second information is received based on the one time use value. Accordingly, the remote unit 102 and/or the network unit 104 may be used for determining a time to perform an update.

Figure 2:
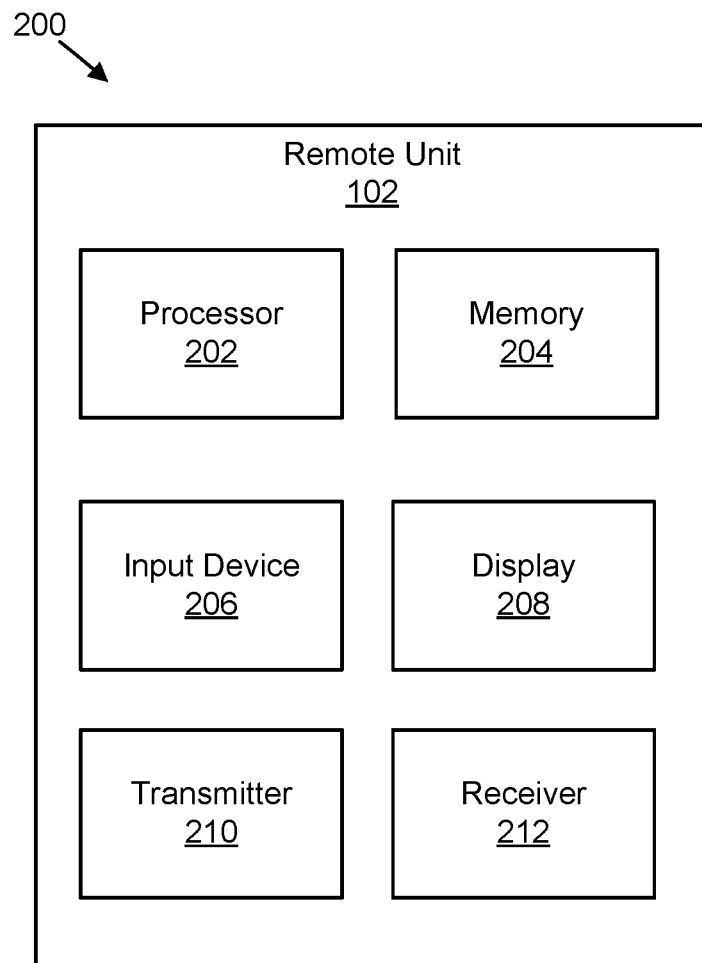
FIG. 2 is a schematic block diagram illustrating one embodiment of an apparatus that may be used for determining a time to perform an update.

FIG. 2 depicts one embodiment of an apparatus 200 that may be used for determining a time to perform an update. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In one embodiment, the transmitter 210 may transmit first information indicating an initial value; and transmit second information indicating an update interval corresponding to the initial value. In various embodiments, the processor 202 may update an identifier at a time determined based on the initial value and the update interval.

In some embodiments, the transmitter 210 may transmit first information indicating an identifier; and transmit second information indicating a one time use value. In certain embodiments, the processor 202 may update an identifier at a time the second information is received based on the one time use value.

In various embodiments, the receiver 212 may receive first information indicating an initial value; and receive second information indicating an update interval corresponding to the initial value. In some embodiments, the processor 202 may update an identifier at a time determined based on the initial value and the update interval.

In certain embodiments, the receiver 212 may receive first information indicating an identifier; and receive second information indicating a one time use value. In various embodiments, the processor 202 may update an identifier at a time the second information is received based on the one time use value.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
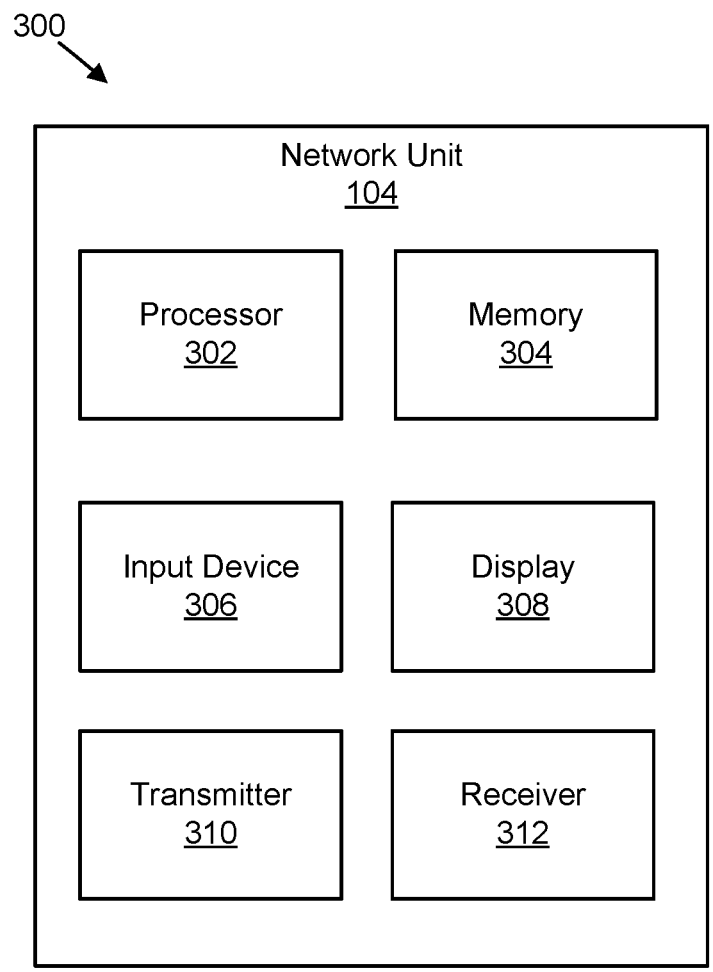
FIG. 3 is a schematic block diagram illustrating one embodiment of an apparatus that may be used for determining a time to perform an update.

FIG. 3 depicts one embodiment of an apparatus 300 that may be used for determining a time to perform an update. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the transmitter 310 may transmit first information indicating an initial value; and transmit second information indicating an update interval corresponding to the initial value. In various embodiments, the processor 302 may update an identifier at a time determined based on the initial value and the update interval.

In some embodiments, the transmitter 310 may transmit first information indicating an identifier; and transmit second information indicating a one time use value. In certain embodiments, the processor 302 may update an identifier at a time the second information is received based on the one time use value.

In various embodiments, the receiver 312 may receive first information indicating an initial value; and receive second information indicating an update interval corresponding to the initial value. In some embodiments, the processor 302 may update an identifier at a time determined based on the initial value and the update interval.

In certain embodiments, the receiver 312 may receive first information indicating an identifier; and receive second information indicating a one time use value. In various embodiments, the processor 302 may update an identifier at a time the second information is received based on the one time use value.

In some embodiments, there may be only one application layer group ID conversion to an L2 ID (e.g., for V2X). In such embodiments, if a group ID is not securely converted by an application layer, an intruder may link back to a UE's groupcast membership. Furthermore, if a mapping of the L2 ID is not securely performed from V2X services (e.g., PSID and/or ITS-AID), an attacker may link to privacy parameters in geographical areas that have privacy support.

In certain embodiments, a UE may be configured or provisioned with a group ID and then may derive from the group ID an L2 ID that is used as a destination ID so that members in the group know that it is a relevant group message. In such embodiments, if the L2 ID is permanently used, then individual group members may be tracked and/or identified. In various embodiments, such as for unicast, a direct handshake may be used for two communication partners to change an L2 ID. In some embodiments, an AS (e.g., V2X AS) may provide a new group ID thereby resulting in a new L2 group ID being generated.

As may be appreciated, different embodiments described herein may be applied to a 5GS, however, the embodiments may also apply to other systems (e.g., EPS, 4G, etc.).

In certain embodiments, UEs in a group change an L2 group ID on their own at the same time, and the UEs in the group change to the same L2 group ID.

In some embodiments, an L2 ID is updated frequently independently from an application layer group ID (e.g., which may not change). In such embodiments, the frequency of the update may depend on a message frequency within a group and may be configuration by an AS (e.g., V2X). In various embodiments, to not communicate a change of an L2 ID to all group members at the same time, a timer may be signaled to indicate a time at which all group members change the L2 ID on their own based on an additionally signaled common time. In such embodiments, application layer signaling may be security protected.

Figure 4:
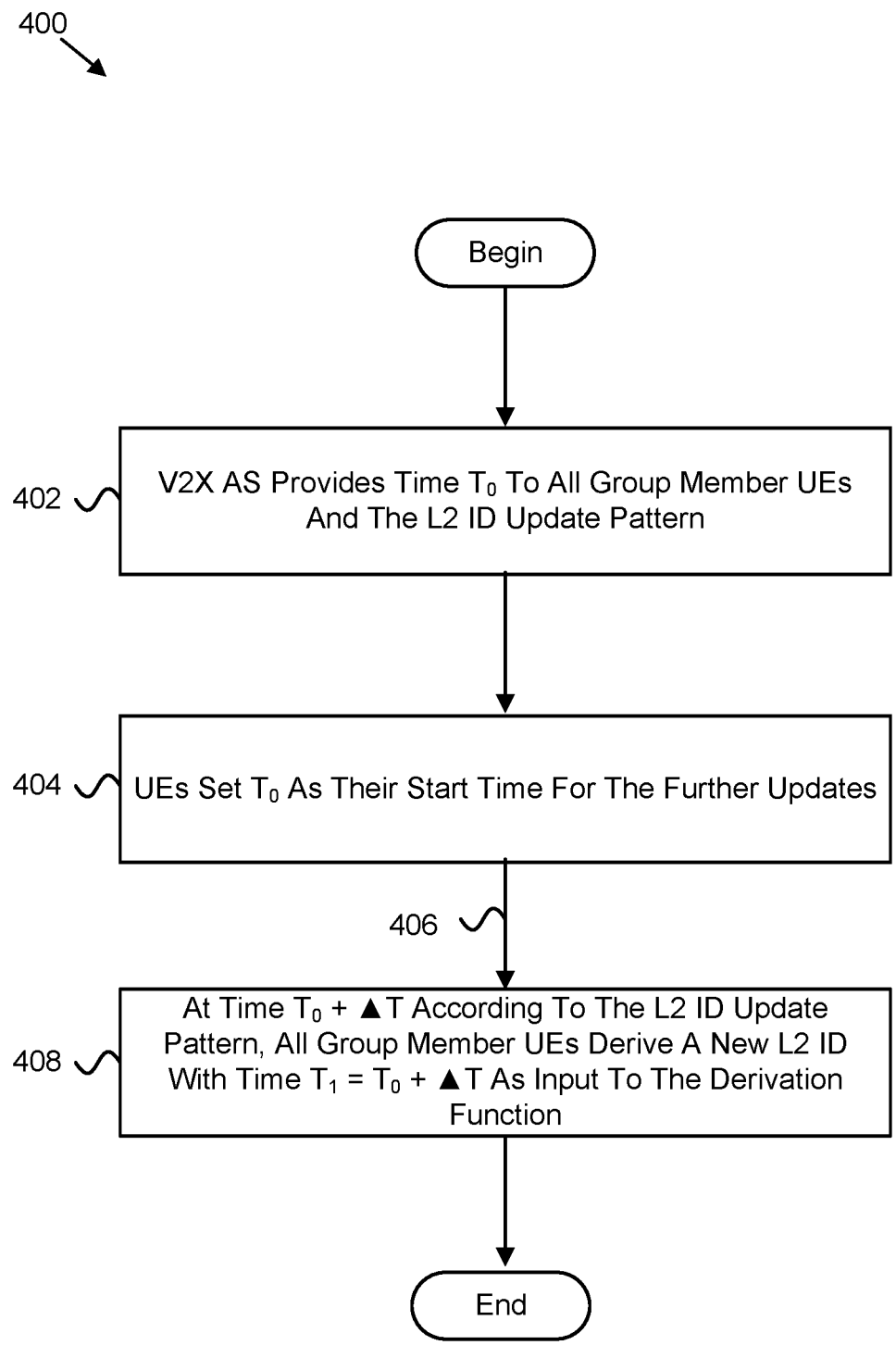
FIG. 4 is a flow chart diagram illustrating one embodiment of a method for determining a time to perform an update.

FIG. 4 is a flow chart diagram illustrating one embodiment of a method 400 for determining a time to perform an update. In this method, a time (or counter) value is used as a secret value and may rely on encrypted application layer signaling to be provided securely to group member UEs. An AS (e.g., V2X AS) may provide 402 a time (e.g., $T_0$) to all group member UEs and an L2 ID update pattern. The time value $T_0$ provided from the AS may not be a real-time "time" (e.g., in UTC format), but may be a random integer input number. Together with the time, the AS may also provide the L2 ID update pattern. The L2 ID update pattern may be a periodic static interval $\Delta T$ or a more sophisticated pattern with varying intervals $\Delta T$. The UEs set 404 $T_0$ as their start time for further updates.

Figure 5:
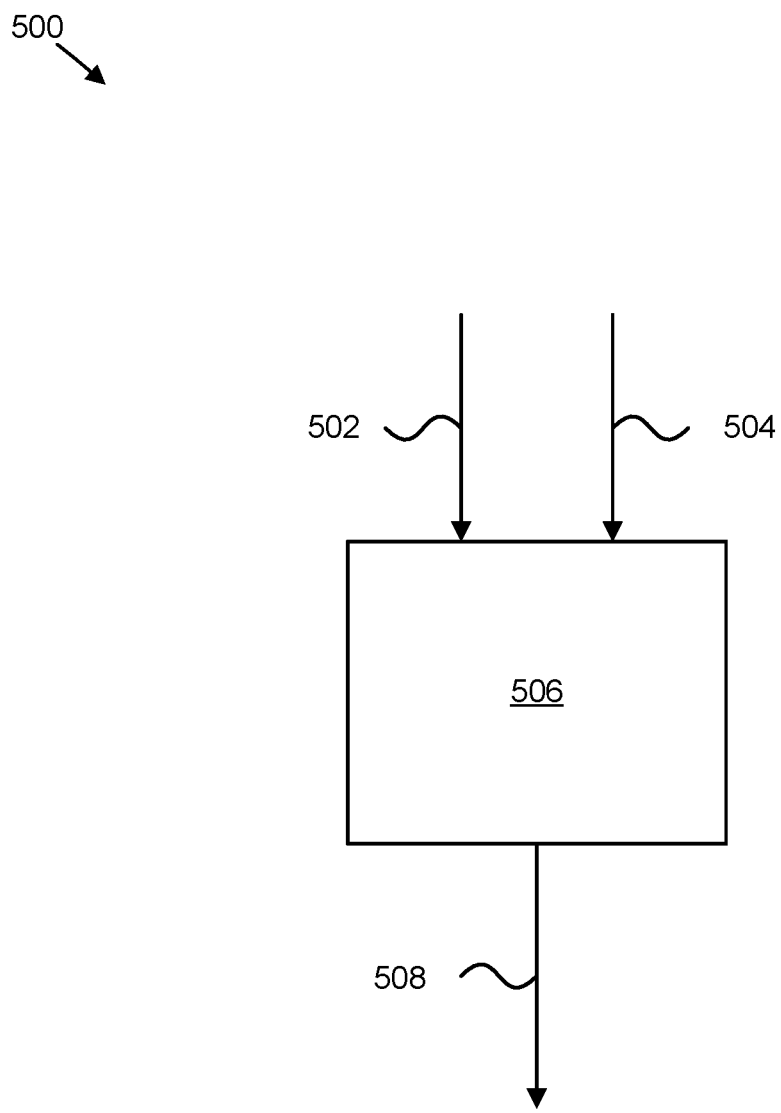
FIG. 5 is a diagram illustrating one embodiment of an identifier derivation.

After the group member UEs receive the time $T_0$ and the L2 ID update pattern, they may derive with those values an L2 ID according to FIG. 5. The group member UEs may update 406 $T_0$ with a time (e.g., in seconds) received either via GNSS (e.g., any supported satellite system such as GPS, BeiDou, Galileo, GLONASS, QZSS, etc.) or SIB9 until the next derivation $T_1$ of the L2 ID according to the L2 ID update pattern at $T_0+\Delta T$. At time $T_0+\Delta T$—according to the L2 ID update pattern, all group member UEs may derive 408 a new L2 ID with time $T_1=T_0+\Delta T$ as an input to a derivation function. This update procedure may be repeated every L2 ID update time interval until group member UEs receive a new time $T_0$ from the AS.

FIG. 5 is a diagram illustrating one embodiment of an identifier derivation 500. For the identifier derivation 500, a group ID 502 and a time 504 are provided to an L2 ID derivation function 506. The L2 ID derivation function 506 outputs an L2 ID 508. The L2 ID derivation function 506 may be a similar to a KDF.

In certain embodiments, an AS (e.g., V2X AS) creates a virtual time value T as a common time basis that is, upon reception at group member UEs, increased in the AS and the group member UEs (e.g., in real time) receive an actual time either from a gNB (e.g., SIB9 ) or GPS. In such embodiments, the virtual time value may be used as an initial secret value and may rely on encrypted application layer signaling to be provided in a secure way to the group member UEs. Furthermore, in such embodiments, the AS provides an L2 ID update time interval $\Delta T$ to the group member UEs. After the group member UEs receive the initial virtual time T and the L2 ID update time interval $\Delta T$, they derive the L2 ID using the virtual time value T and the application layer group ID as input to the derivation function. Thus, all group member UEs derive the same L2 ID independently of a transmission delay. The group member UEs then update the virtual time T with the time received either via GPS or SIB9 until the next derivation of the L2 ID according to the L2 ID update time interval (e.g., time $T+\Delta T$). This update procedure may be repeated every L2 ID update time interval in each group member UE until the group member UEs receive a new initial virtual time from the AS.

In some embodiments, if a group member UE does not receive a provisioning message (e.g. the group member UE is out of coverage of a mobile network), then the group member UE is not able to receive corresponding group messages from in-coverage group members due to an L2 ID mismatch. However, the group member UE (e.g., "out of coverage" UE) cannot receive those messages anyway.

Figure 6:
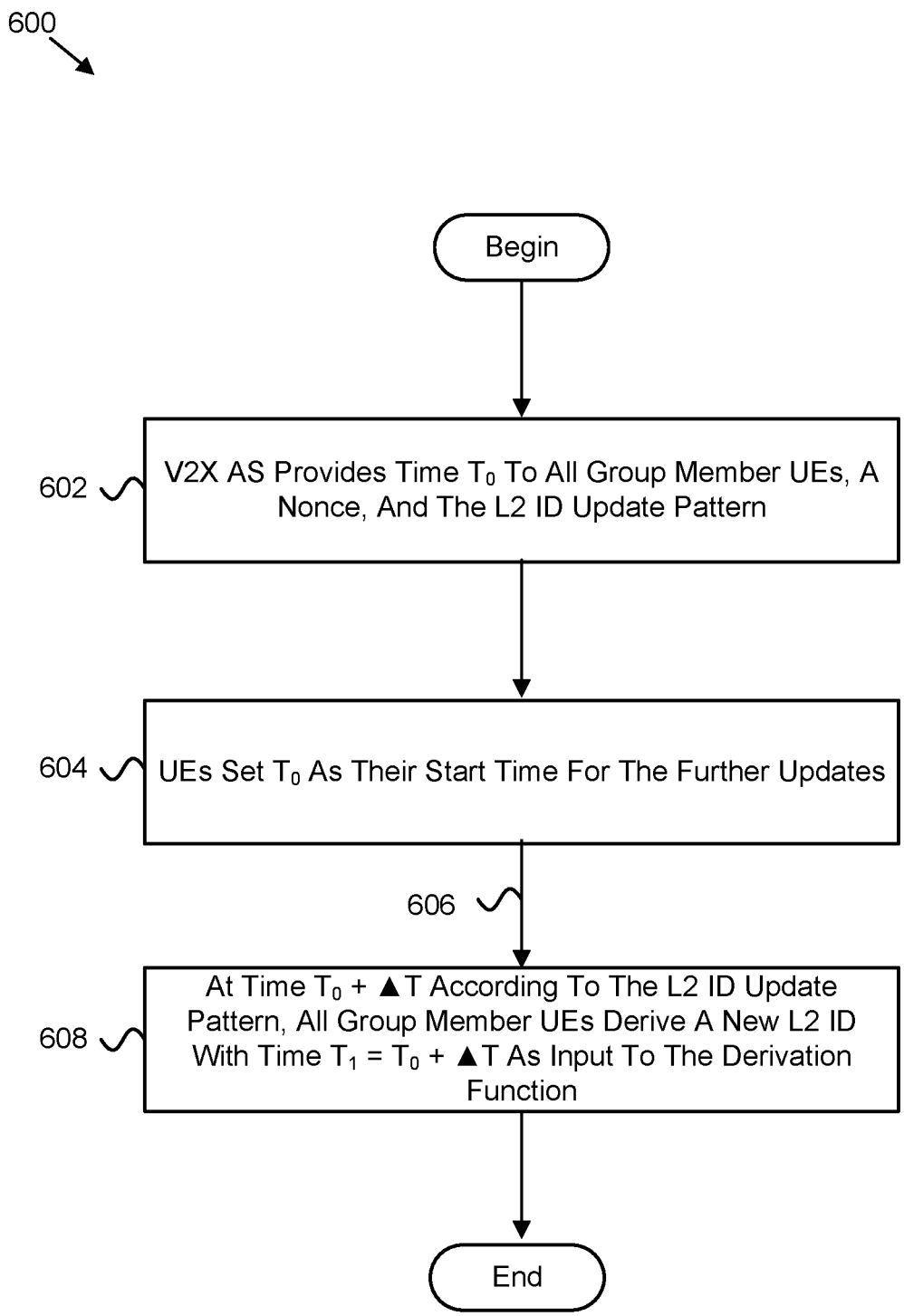
FIG. 6 is a flow chart diagram illustrating another embodiment of a method for determining a time to perform an update.

FIG. 6 is a flow chart diagram illustrating another embodiment of a method 600 for determining a time to perform an update. In this method, a time (or counter) value is used as a secret value and may rely on encrypted application layer signaling to be provided securely to group member UEs. An AS (e.g., V2X AS) may provide 602 a time (e.g., an initial time, $T_0$) to all group member UEs, a nonce, and an L2 ID update pattern. As used herein, a nonce may be a one-time use number, a random value, a one-time use time, a random time, a secret value, a selected value that is repeatedly used, and so forth. The time value $T_0$ provided from the AS may be a real-time "time" (e.g., in UTC format), but may have an offset to a current GNSS (e.g., any supported satellite system such as GPS, BeiDou, Galileo, GLONASS, QZSS, etc.) time. Together with the time, the AS may also provide the L2 ID update pattern, which may be a periodic static interval $\Delta T$ or a more sophisticated pattern with varying intervals $\Delta T$. The L2 ID update pattern may be a periodic static interval $\Delta T$ or a more sophisticated pattern with varying intervals $\Delta T$. Since an attacker may guess an offset to a current GNSS time, the nonce is sent to the group member UEs as well as the secret value for the derivation function. The AS may change the nonce at every provisioning and the nonce may be a randomly generate value. The UEs set 604 $T_0$ as their start time for further updates.

Figure 7:
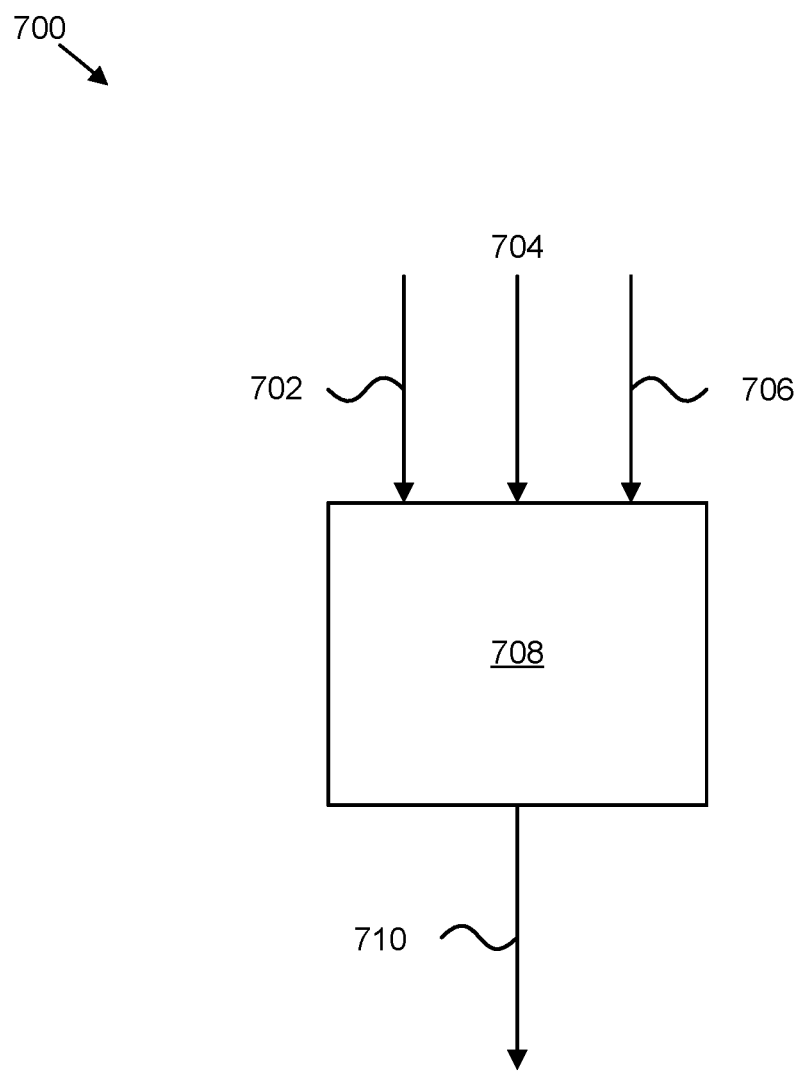
FIG. 7 is a diagram illustrating another embodiment of an identifier derivation.

After the group member UEs receive the time $T_0$, the nonce, and the L2 ID update pattern, they may derive with those values an L2 ID according to FIG. 7. The group member UEs may update 606 $T_0$ with a time (e.g., in seconds) received either via GNSS (e.g., any supported satellite system such as GPS, BeiDou, Galileo, GLONASS or QZSS etc.) or SIB9 until the next derivation time $T_1$ of the L2 ID according to the L2 ID update pattern at $T_0+\Delta T$. At time $T_0+\Delta T$—according to the L2 ID update pattern, all group member UEs may derive 608 a new L2 ID with time $T_1=T_0+\Delta T$ and the nonce as inputs to a derivation function. This update procedure may be repeated every L2 ID update time interval until group member UEs receive a new time $T_0$ from the AS.

FIG. 7 is a diagram illustrating another embodiment of an identifier derivation 700. For the identifier derivation 700, a group ID 702, a time 704, and a nonce 706 are provided to an L2 ID derivation function 708. The L2 ID derivation function 708 outputs an L2 ID 710. The L2 ID derivation function 710 may be a similar to a KDF.

In various embodiments, providing an initial time, a possible nonce, and an update pattern is performed each time a new group member UE is registering (e.g., for all group members the new $T_0=T_R$, the time the new group member UE registers). In certain embodiments, as shown in FIG. 8, an AS (e.g., V2X AS) keeps track of a current time and instructs only new registered UEs with a corresponding updated time (e.g., $T_R=T_0$ plus the time difference until the new registration).

Figure 8:
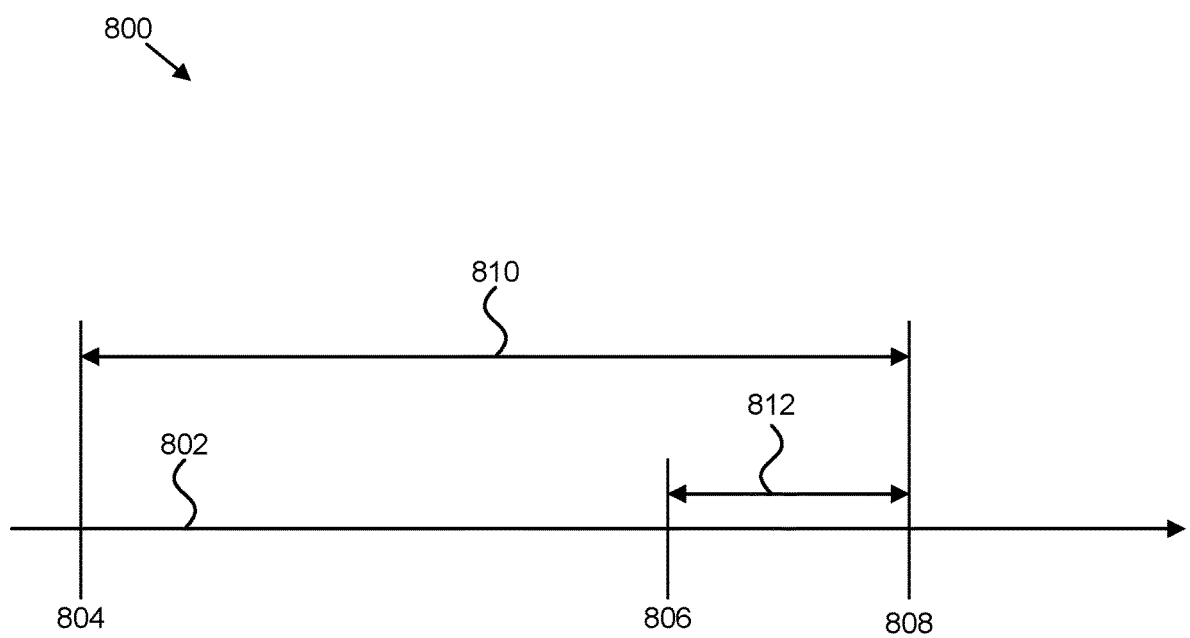
FIG. 8 is a timing diagram illustrating timing for performing an update.

Specifically, FIG. 8 is a timing diagram illustrating timing 800 for performing an update over a time period 802. A first time 804 (e.g., $T_0$) is provided to all group members as an initial time. A second time 806 (e.g., $T_R$) is a time at which a new group member registers. A third time 808 (e.g., $T_1$) is a time of a next L2 ID update according to an L2 ID update pattern. A first time period 810 is $\Delta T$ (e.g., update time interval according to the L2 ID update pattern), and a second time period 812 is $\Delta T_R$ (e.g., the time from $T_R$ to $T_1$). A new registered UE that registers at the second time 806 may be provided initially with the second time 806 and the second time period 812 so that it may sync with the initially registered group members. The new registered UE may also be provided with the first time period 810 so that after its first update, it can be synchronized with the other group members for the following updates.

In some embodiments, if a group member UE does not receive a provisioning message as described in embodiments herein described (e.g., the group member UE is out of coverage of a mobile network), then the group member UE is not able to receive corresponding group messages from the in-coverage group members due to an L2 ID mismatch.

In various embodiments, after an "out of coverage" group member UE recognizes it is back to coverage, it may be recommended that the group member UE reregisters to an AS (e.g., V2X AS) to receive a fresh initial time, an update pattern, and a possible nonce to be used in a procedure for new joining group member UEs.

In certain embodiments, if one of the UEs belonging to a group is still connected to a network, "out of coverage" UEs belonging the same group ID may receive a provisioning message through an in-coverage UE (e.g., remote UE to network relay). In some embodiments, a group leader UE or a platoon leader UE may provide a provisioning message to group members locally.

In various embodiments, if a UE is "out-of-coverage," it may be assumed that it still receives GNSS time information which may be mapped to "in-coverage" time information via SIB9 with broadcasted additional information in SIB9.

In certain embodiments, an AS (e.g., V2X AS) does not provide any timing information (e.g., there is no L2 ID update pattern provided to group member UEs). Instead, in such embodiments, the AS runs an L2 ID update pattern internally and provides a new nonce to all group member UEs after each ΔT. This may mean that every ΔT of the update pattern, a message is sent by the AS to all group members with a newly generate nonce. The group member UEs use the nonce as a secret value to derive an L2 ID. In such embodiments, no time information is used, but signaling overhead may be increased. Group member UEs that are "out of coverage" that move into coverage may simply request a current nonce to derive a current L2 ID. The L2 ID derivation function used may be similar to a KDF.

Figure 9:
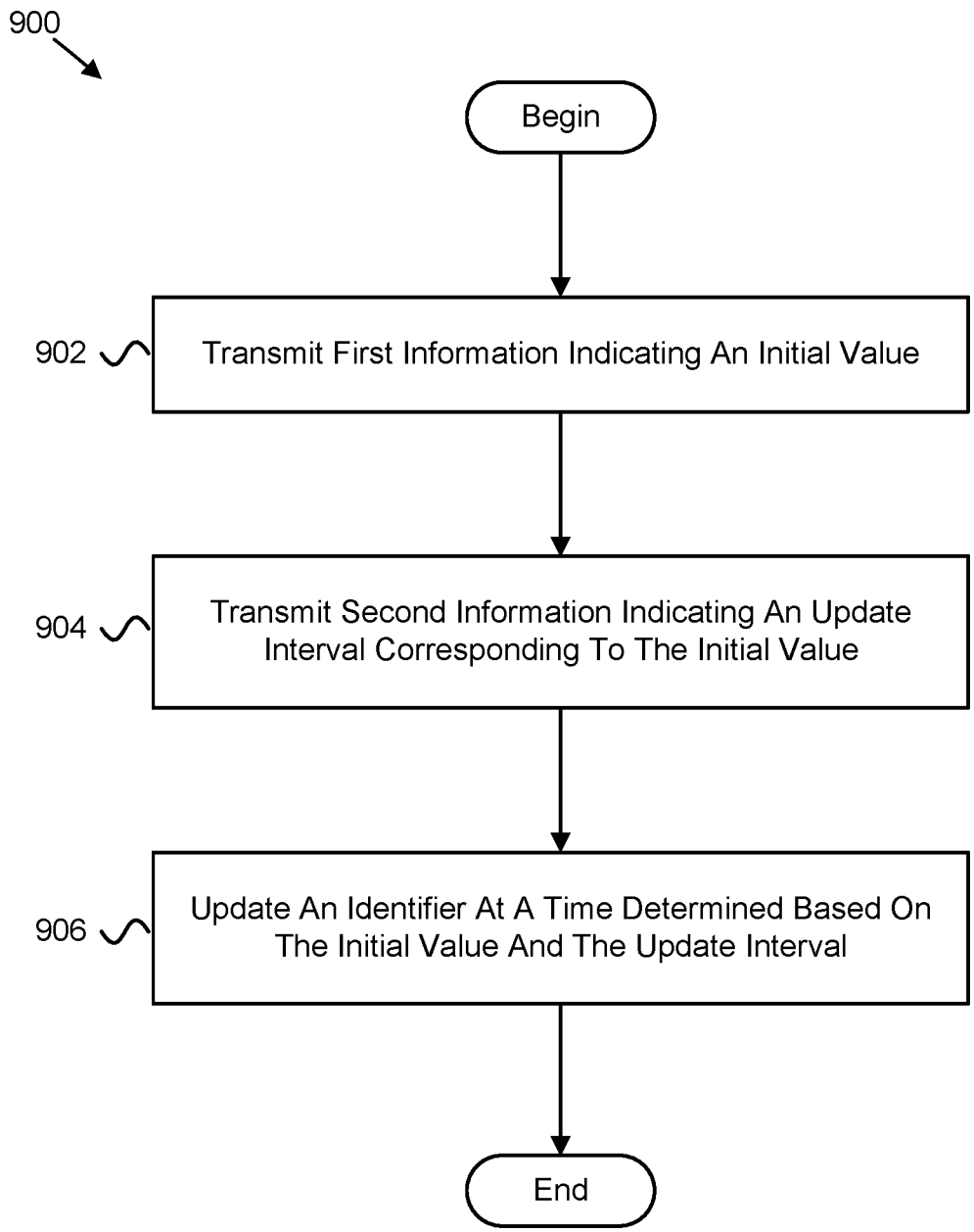
FIG. 9 is a flow chart diagram illustrating a further embodiment of a method for determining a time to perform an update.

FIG. 9 is a flow chart diagram illustrating a further embodiment of a method 900 for determining a time to perform an update. In some embodiments, the method 900 is performed by an apparatus, such as the remote unit 102 and/or the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes transmitting 902 first information indicating an initial value. In some embodiments, the method 900 includes transmitting 904 second information indicating an update interval corresponding to the initial value. In certain embodiments, the method 900 includes updating 906 an identifier at a time determined based on the initial value and the update interval.

In certain embodiments, the identifier is updated using a function determined based on the initial value and the update value. In some embodiments, the initial value comprises an initial counter value. In various embodiments, the initial value comprises an initial time value. In one embodiment, the initial value comprises a random value. In certain embodiments, the update interval comprises a pattern for altering the initial value to determine an updated value. In some embodiments, the update interval comprises an update time period, and the identifier is updated each time the update time period elapses.

In various embodiments, the method 900 further comprising transmitting third information indicating a shared secret value. In one embodiment, the shared secret value comprises a random number. In certain embodiments, the time for updating the identifier is determined based on the initial value, the update interval, and the shared secret value. In some embodiments, the identifier is updated using a function determined based on the initial value, the update value, and the shared secret value.

Figure 10:
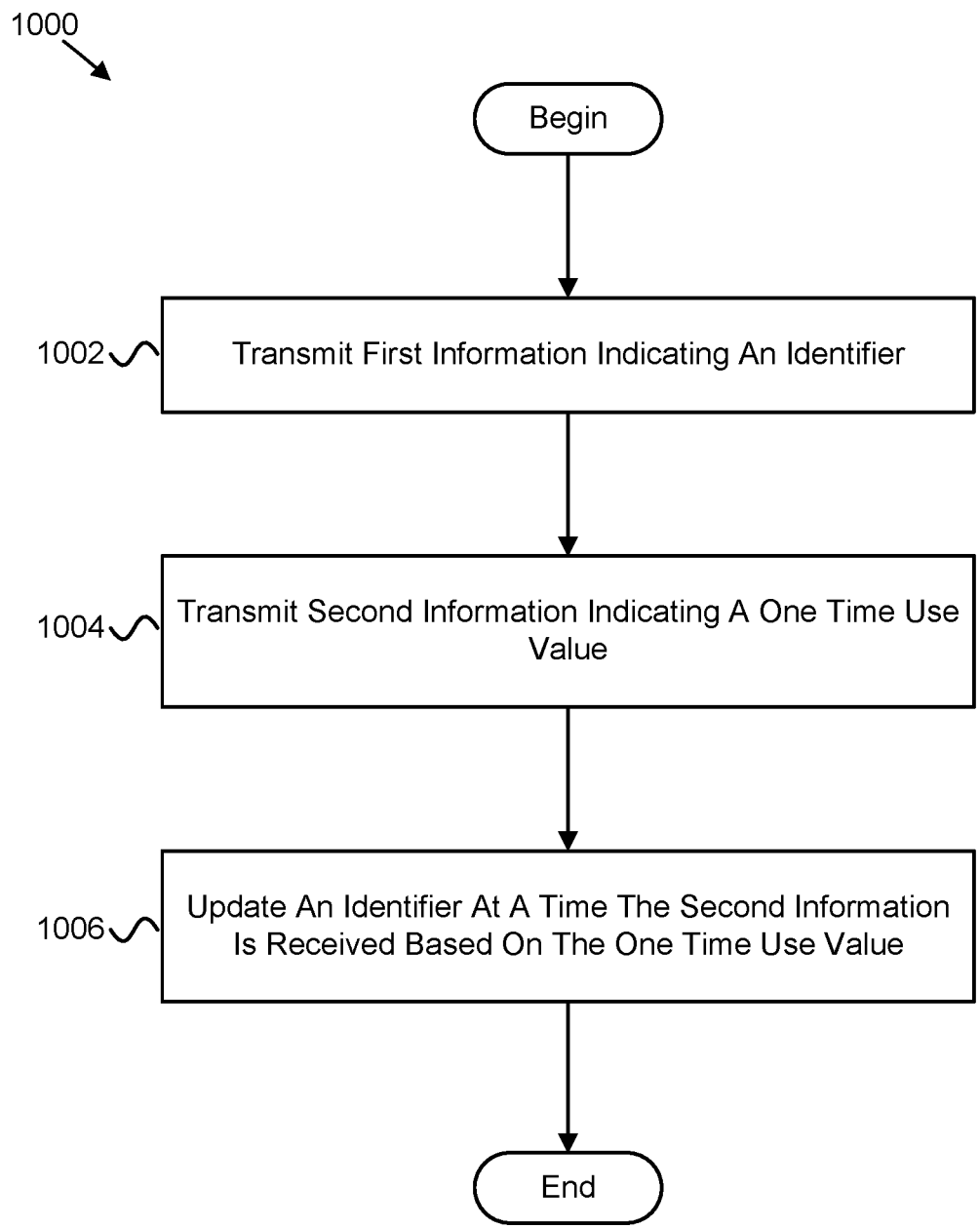
FIG. 10 is a flow chart diagram illustrating yet another embodiment of a method for determining a time to perform an update.

FIG. 10 is a flow chart diagram illustrating yet another embodiment of a method 1000 for determining a time to perform an update. In some embodiments, the method 1000 is performed by an apparatus, such as the remote unit 102 and/or the network unit 104. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes transmitting 1002 first information indicating an identifier. In some embodiments, the method 1000 includes transmitting 1004 second information indicating a one time use value. In certain embodiments, the method 1000 includes updating 1006 an identifier at a time the second information is received based on the one time use value.

In certain embodiments, the one time use value is transmitted according to an update interval value.

Figure 11:
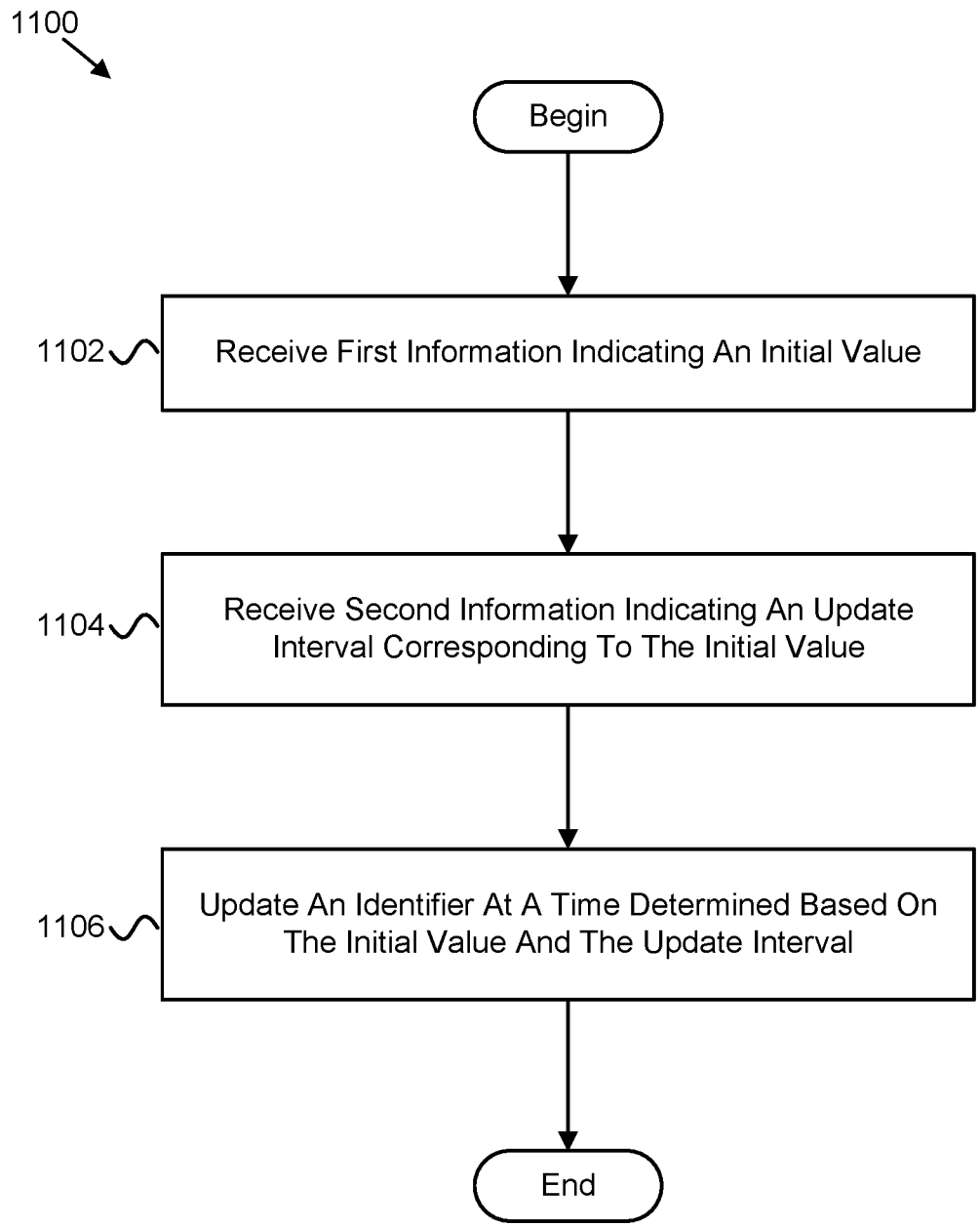
FIG. 11 is a flow chart diagram illustrating another embodiment of a method for determining a time to perform an update.

FIG. 11 is a flow chart diagram illustrating another embodiment of a method 1100 for determining a time to perform an update. In some embodiments, the method 1100 is performed by an apparatus, such as the remote unit 102 and/or the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes receiving 1102 first information indicating an initial value. In some embodiments, the method 1100 includes receiving 1104 second information indicating an update interval corresponding to the initial value. In certain embodiments, the method 1100 includes updating 1106 an identifier at a time determined based on the initial value and the update interval.

In certain embodiments, the identifier is updated using a function determined based on the initial value and the update value. In some embodiments, the initial value comprises an initial counter value. In various embodiments, the initial value comprises an initial time value.

In one embodiment, the initial value comprises a random value. In certain embodiments, the update interval comprises a pattern for altering the initial value to determine an updated value. In some embodiments, the update interval comprises an update time period, and the identifier is updated each time the update time period elapses.

In various embodiments, the method 1100 further comprises receiving third information indicating a shared secret value. In one embodiment, the shared secret value comprises a random number. In certain embodiments, the time for updating the identifier is determined based on the initial value, the update interval, and the shared secret value. In some embodiments, the identifier is updated using a function determined based on the initial value, the update value, and the shared secret value.

Figure 12:
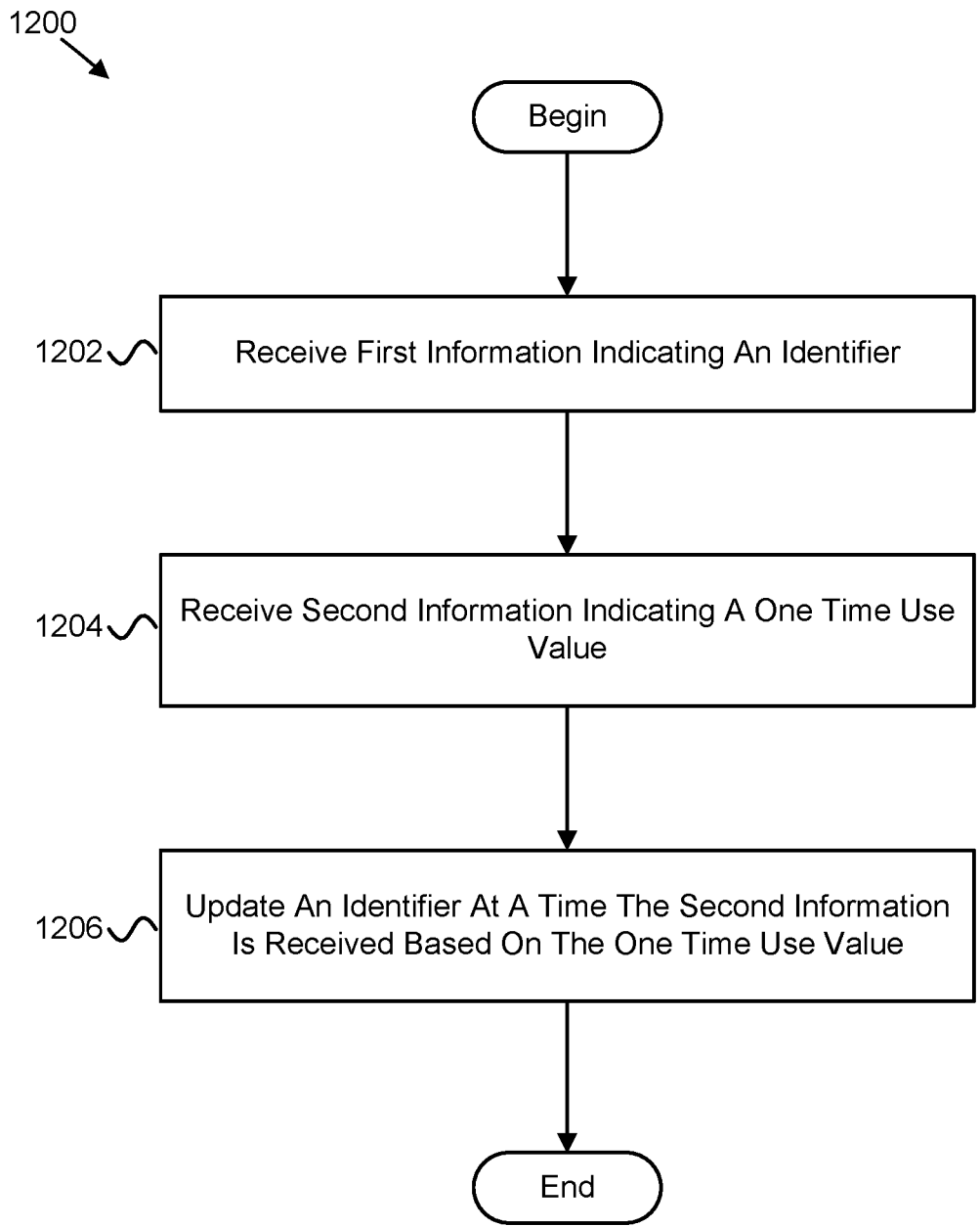
FIG. 12 is a flow chart diagram illustrating an additional embodiment of a method for determining a time to perform an update.

FIG. 12 is a flow chart diagram illustrating an additional embodiment of a method 1200 for determining a time to perform an update. In some embodiments, the method 1200 is performed by an apparatus, such as the remote unit 102 and/or the network unit 104. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes receiving 1202 first information indicating an identifier. In some embodiments, the method 1200 includes receiving 1204 second information indicating a one time use value. In certain embodiments, the method 1200 includes updating 1206 an identifier at a time the second information is received based on the one time use value.

In certain embodiments, the one time use value is transmitted according to an update interval value.

In one embodiment, a method comprises: transmitting first information indicating an initial value; transmitting second information indicating an update interval corresponding to the initial value; and updating an identifier at a time determined based on the initial value and the update interval.

In certain embodiments, the identifier is updated using a function determined based on the initial value and the update value.

In some embodiments, the initial value comprises an initial counter value.

In various embodiments, the initial value comprises an initial time value.

In one embodiment, the initial value comprises a random value.

In certain embodiments, the update interval comprises a pattern for altering the initial value to determine an updated value.

In some embodiments, the update interval comprises an update time period, and the identifier is updated each time the update time period elapses.

In various embodiments, the method further comprising transmitting third information indicating a shared secret value.

In one embodiment, the shared secret value comprises a random number.

In certain embodiments, the time for updating the identifier is determined based on the initial value, the update interval, and the shared secret value.

In some embodiments, the identifier is updated using a function determined based on the initial value, the update value, and the shared secret value.

In one embodiment, an apparatus comprises: a transmitter that: transmits first information indicating an initial value; and transmits second information indicating an update interval corresponding to the initial value; and a processor that updates an identifier at a time determined based on the initial value and the update interval.

In certain embodiments, the identifier is updated using a function determined based on the initial value and the update value.

In some embodiments, the initial value comprises an initial counter value.

In various embodiments, the initial value comprises an initial time value.

In one embodiment, the initial value comprises a random value.

In certain embodiments, the update interval comprises a pattern for altering the initial value to determine an updated value.

In some embodiments, the update interval comprises an update time period, and the identifier is updated each time the update time period elapses.

In various embodiments, the transmitter transmits third information indicating a shared secret value.

In one embodiment, the shared secret value comprises a random number.

In certain embodiments, the time for updating the identifier is determined based on the initial value, the update interval, and the shared secret value.

In some embodiments, the identifier is updated using a function determined based on the initial value, the update value, and the shared secret value.

In one embodiment, a method comprises: transmitting first information indicating an identifier; transmitting second information indicating a one time use value; and updating an identifier at a time the second information is received based on the one time use value.

In certain embodiments, the one time use value is transmitted according to an update interval value.

In one embodiment, an apparatus comprises: a transmitter that: transmits first information indicating an identifier; and transmits second information indicating a one time use value; and a processor that updates an identifier at a time the second information is received based on the one time use value.

In certain embodiments, the one time use value is transmitted according to an update interval value.

In one embodiment, a method comprises: receiving first information indicating an initial value; receiving second information indicating an update interval corresponding to the initial value; and updating an identifier at a time determined based on the initial value and the update interval.

In certain embodiments, the identifier is updated using a function determined based on the initial value and the update value.

In some embodiments, the initial value comprises an initial counter value.

In various embodiments, the initial value comprises an initial time value.

In one embodiment, the initial value comprises a random value.

In certain embodiments, the update interval comprises a pattern for altering the initial value to determine an updated value.

In some embodiments, the update interval comprises an update time period, and the identifier is updated each time the update time period elapses.

In various embodiments, the method further comprises receiving third information indicating a shared secret value.

In one embodiment, the shared secret value comprises a random number.

In certain embodiments, the time for updating the identifier is determined based on the initial value, the update interval, and the shared secret value.

In some embodiments, the identifier is updated using a function determined based on the initial value, the update value, and the shared secret value.

In one embodiment, an apparatus comprises: a receiver that: receives first information indicating an initial value; and receives second information indicating an update interval corresponding to the initial value; and a processor that updates an identifier at a time determined based on the initial value and the update interval.

In certain embodiments, the identifier is updated using a function determined based on the initial value and the update value.

In some embodiments, the initial value comprises an initial counter value.

In various embodiments, the initial value comprises an initial time value.

In one embodiment, the initial value comprises a random value.

In certain embodiments, the update interval comprises a pattern for altering the initial value to determine an updated value.

In some embodiments, the update interval comprises an update time period, and the identifier is updated each time the update time period elapses.

In various embodiments, the receiver receives third information indicating a shared secret value.

In one embodiment, the shared secret value comprises a random number.

In certain embodiments, the time for updating the identifier is determined based on the initial value, the update interval, and the shared secret value.

In some embodiments, the identifier is updated using a function determined based on the initial value, the update value, and the shared secret value.

In one embodiment, a method comprises: receiving first information indicating an identifier; receiving second information indicating a one time use value; and updating an identifier at a time the second information is received based on the one time use value.

In certain embodiments, the one time use value is transmitted according to an update interval value.

In one embodiment, an apparatus comprises: a receiver that: receives first information indicating an identifier; and receives second information indicating a one time use value; and a processor that updates an identifier at a time the second information is received based on the one time use value.

In certain embodiments, the one time use value is transmitted according to an update interval value.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of performing a network function, the method comprising:
   transmitting first information indicating an initial value associated with a start time for an update;
   transmitting second information indicating an update interval associated with the initial value; and
   updating an identifier at a time determined according to a sum of the initial value and the update interval.

2. The method of claim 1, wherein updating the identifier comprises:
   updating the identifier using a function determined based on the initial value and the update interval.

3. The method of claim 1, wherein the initial value comprises an initial counter value, an initial time value, or a random value.

4. The method of claim 1, wherein the update interval comprises a pattern for altering the initial value to determine an updated value.

5. The method of claim 1, wherein the update interval comprises an update time period, and wherein updating the identifier is based on the update time period lapsing.

6. A method performed by a user equipment (UE), the method comprising:
   receiving first information indicating an initial value associated with a start time for an update;
   receiving second information indicating an update interval associated with the initial value; and
   updating an identifier at a time determined according to a sum of the initial value and the update interval.

7. The method of claim 6, wherein updating the identifier comprises:
   updating the identifier using a function determined based on the initial value and the update interval.

8. The method of claim 6, wherein the initial value comprises an initial counter value, an initial time value, or a random value.

9. The method of claim 6, wherein the update interval comprises a pattern for altering the initial value to determine an updated value.

10. The method of claim 6, wherein the update interval comprises an update time period, and wherein updating the identifier is based on the update time period lapsing.

11. A user equipment (UE), comprising:
    at least one memory; and
    at least one processor coupled with the at least one memory and configured to cause the UE to:
       receive first information indicating an initial value associated with a start time for an update;
       receive second information indicating an update interval associated with the initial value; and
       update an identifier at a time determined according to a sum of the initial value and the update interval.

12. The UE of claim 11, wherein the at least one processor is configured to cause the UE to update the identifier using a function determined based on the initial value and the update interval.

13. The UE of claim 11, wherein the initial value comprises an initial counter value, an initial time value, or a random value.

14. The UE of claim 11, wherein the update interval comprises a pattern for altering the initial value to determine an updated value.

15. The UE of claim 11, wherein the update interval comprises an update time period, and the at least one processor is configured to cause the UE to update the identifier based on the update time period lapsing.

16. A processor for wireless communication, comprising:
    at least one controller coupled with at least one memory and configured to cause the processor to:
       receive first information indicating an initial value associated with a start time for an update;
       receive second information indicating an update interval associated with the initial value; and
       update an identifier at a time determined according to a sum of the initial value and the update interval.

17. The processor of claim 16, wherein the at least one controller is configured to cause the processor to update the identifier using a function determined based on the initial value and the update interval.

18. The processor of claim 16, wherein the initial value comprises an initial counter value, an initial time value, or a random value.

19. The processor of claim 16, wherein the update interval comprises a pattern for altering the initial value to determine an updated value.

20. The processor of claim 16, wherein the update interval comprises an update time period, and the at least one controller is configured to cause the processor to update the identifier based on the update time period lapsing.

* * * * *